April 20, 1943.  E. W. O'NEIL  2,316,970
ANIMAL TRAP
Filed May 23, 1941  2 Sheets-Sheet 2
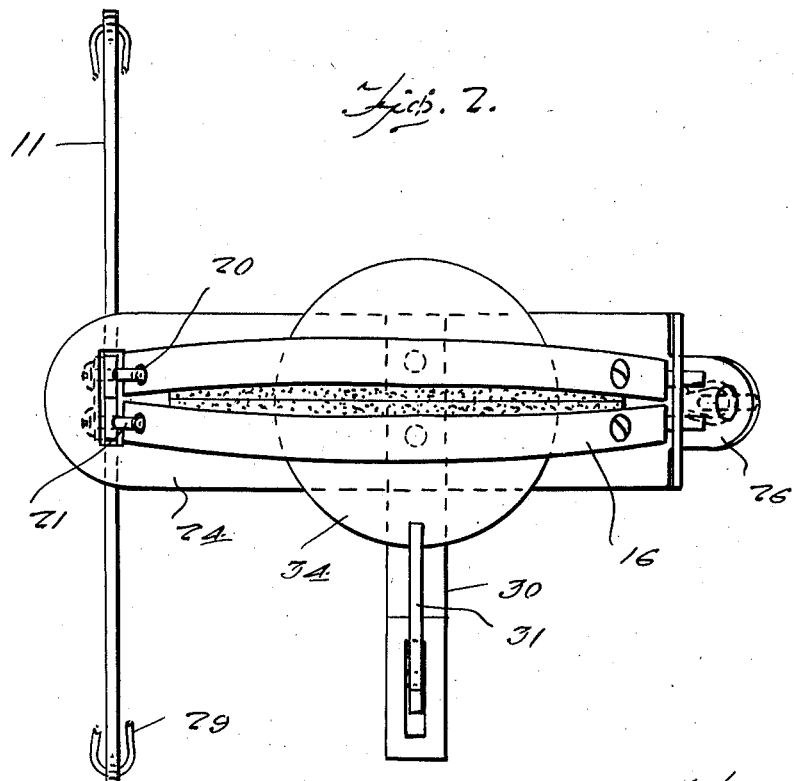
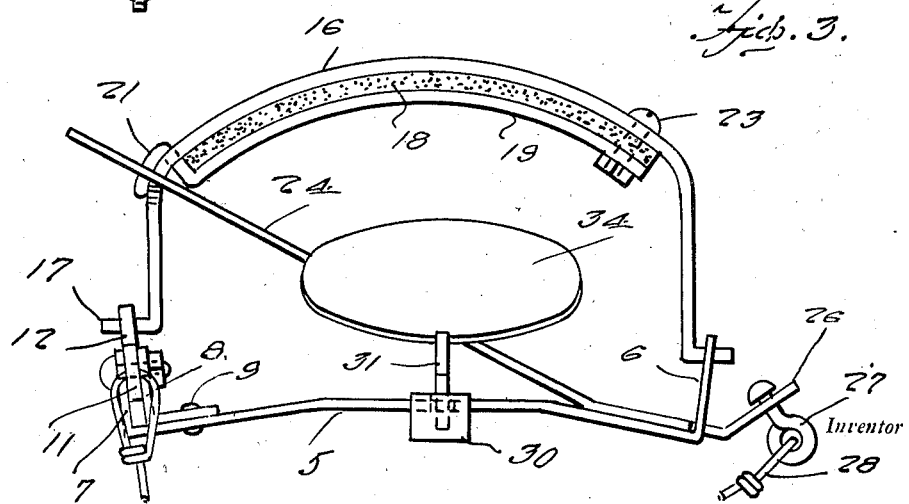
Earl W. O'Neil
Inventor
By Clarence A. O'Brien
Attorney Patented Apr. 20, 1943

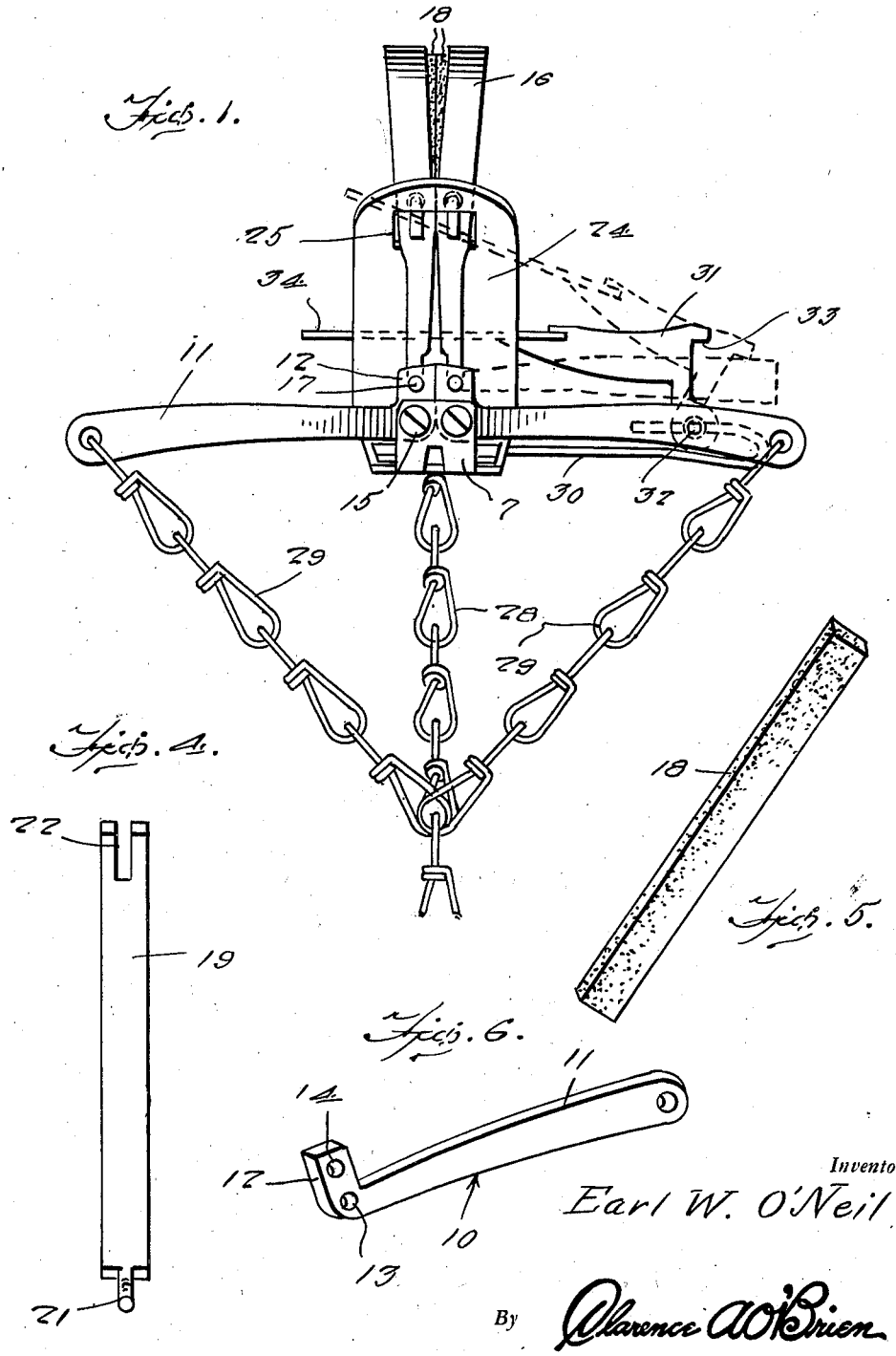

2,316,970

UNITED STATES PATENT OFFICE 2,316,970

ANIMAL TRAP

Earl W. O'Neil, Port Henry, N. Y.

Application May 23, 1941, Serial No. 394,939

3 Claims. (Cl. 43—88)

The present invention relates to new and useful improvements in animal traps of a type embodying a pair of pivoted spring actuated jaws adapted for upward swinging movement for gripping the leg of the animal, and the invention has for its primary object to provide means for firmly, but painlessly holding the leg of the animal in gripping engagement and in which the gripping pressure of the jaws is regulated by the action of the animal in its attempt to free itself, so that an increase in the pulling force of the animal on the trap will operate to increase the gripping action of the jaws.

A further object is to provide a trap of this character which is simple and practical in construction, efficient and reliable in performance, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, and in which:

Figure 1 is an end elevational view.

Figure 2 is a top plan view.

Figure 3 is a side elevational view.

Figure 4 is a plan view of one of the clamps for the yieldable insert of the jaws.

Figure 5 is a perspective view of one of the yieldable or resilient inserts, and Figure 6 is a perspective view of one of the levers for increasing the gripping action of the jaws.

Referring now to the drawings in detail, wherein for the purpose of illustration I have disclosed a preferred embodiment of the invention, the numeral 5 designates a metal substantially U-shaped base plate having upstanding ends 6 and 7, the upstanding end 7 having an L-shaped bracket 8 secured in spaced relation thereto by means of a rivet 9 secured to the base 5. A pair of L-shaped levers, designated generally at 10, are provided, and include a long arm 11 and a short arm 12, the levers being provided with an opening 13 at the junction of the arms and also having an opening 14 adjacent the end of the short arm 12 as shown to advantage in Figure 6 of the drawings. Pivot pins or bolts 15 are inserted through the upstanding ends 7 and the upstanding end of the bracket 8, the pins extending through the openings 13 of the respective levers for pivotally mounting the same on the ends of the base of the trap, with the short arms 12 extending upwardly, and the long arms 11 projecting outwardly from opposite sides of the trap, as shown in Figure 1 of the drawings.

The pair of trap jaws of inverted U-form designated at 16 have one outturned end of each jaw designated at 17 inserted in an opening 14 of one of the levers 10, while the other ends of the jaws are pivoted in the upstanding end 6 of the base.

To the under side of the central portion of the jaws 16 is secured a resilient strip 18 by means of a clamping member 19, one end of the clamping member extending through an opening 20 of the jaw and then angularly as shown at 21 to secure the said end of the clamping member in position to the jaw while the other end of the clamping member is bifurcated as shown at 22 for receiving a bolt 23 carried by the jaw for securing the yieldable strip or insert 18 to the jaw with one edge of the strip projecting beyond the inner clamping edge of the jaw as shown in Figure 2 of the drawings so that when the jaws are in closed position the edges of the insert will be in abutting relation for clamping the foot of an animal therebetween. The usual leaf spring for actuating the trap is shown at 24 which has an opening 25 for sliding on the jaws adjacent one end thereof, the spring having its opposite end welded or otherwise secured to the base 5, the attached end of the spring projecting outwardly beyond the base as shown at 26 and provided with a swivel eye 27 for attaching a chain 28 thereto. The chain 28 extends longitudinally under the base and also has short chains 29 attached thereto for connection with the outer ends of the long arms 11 of the levers 10 as shown in Figure 1 of the drawings.

A trigger arm 30 projects laterally from one side of the base 5, the outer end of the arm having the trigger 31 pivoted thereto as shown at 32, the trigger including a shoulder 33 under which one of the jaws 16 is adapted for engagement to secure the jaws in a set position as shown by the dotted lines in Figure 1. Also secured to the trigger is the bait pan 34 disposed over the base and substantially at the center of the jaws.

The downward movement of the pan 34, as by the weight of an animal when stepping thereon, will release the jaws causing the spring 24 to swing the jaws upwardly into their closed positions.

The jaws being pivoted on the upper ends of the levers 10 will be urged toward each other by a downward pulling force exerted on the outer ends of the levers. Accordingly the action of the animal in pulling against the chain 28 which is tethered in the usual manner, will result in a downward pull on the levers, thus tending to close the jaws tighter, and the more the animal pulls on the trap the tighter the jaws will grip its foot.

It is believed the details of construction and operation of the device will be readily understood from the foregoing without further detailed explanation.

Having thus described the invention, what I claim as new is:

1. An animal trap comprising a base, a pair of levers pivoted to the base and projecting outwardly from opposite sides thereof, a pair of spring actuated jaws pivoted at one end on the levers and pivoted at their opposite ends on the base, setting and releasing means for the jaws, and an anchoring connection for the levers operable upon a pulling force being exerted on the trap to increase the closing pressure of the jaws after the jaws have been released.

2. An animal trap comprising a pair of spring actuated U-shaped jaws adapted for edgewise closing engagement, an elongated yieldable insert having an edge projecting beyond the abutting edge of each jaw, and a clamping plate for the insert having one end pivoted to the jaw and a fastening device for the other end of the plate, said insert being held against one surface of the jaw throughout its length by the clamping plate.

3. An animal trap comprising a pair of pivoted, spring-actuated jaws having trunnions for attachment to the trap, and gripping portions setting and releasing means for the jaws, an anchoring device for said trap, and means connected with the anchoring device and operable upon a pulling force being exerted on the trap for separating the trunnions at least at one end of the jaws to increase the pressure at their gripping portions after the jaws have been released.

EARL W. O'NEIL.